United States Patent Office 3,507,790
Patented Apr. 21, 1970

3,507,790
EMULSIFIABLE GLASS MOLD LUBRICANTS
Alan Beerbower, Westfield, Edward L. Kayle, Colonia, and Anthony Lagani, Jr., Newark, N.J., assignors to Esso Research and Engineering Company, a corporation of Delaware
No Drawing. Continuation-in-part of application Ser. No. 638,170, Mar. 30, 1967, which is a continuation-in-part of application Ser. No. 370,847, May 28, 1964. This application May 21, 1968, Ser. No. 730,904
Int. Cl. C10m 1/48, 1/26, 1/22
U.S. Cl. 252—32.7          10 Claims

ABSTRACT OF THE DISCLOSURE

Oil-in-water emulsions suitable for use in glass molding and metal working operations may be prepared from admixtures of a high molecular weight petroleum oil, a hydrocarbon solvent and a surfactant combination comprising: (1) the reaction product of ethylene oxide or propylene oxide with a compound selected from the group consisting of a partial ester or sorbitol, a fatty alcohol, a fatty acid, an aliphatic amine, an alkyl phenol and mixtures thereof, (2) a coupling agent such as cyclohexanol and (3) a neutralized high molecular weight organic acid such as an amine derivative of monoalkenyl succinic anhydride.

CROSS-REFERENCES TO RELATED APPLICATIONS

This application is a continuation-in-part of our co-pending application, Ser. No. 638,170, filed Mar. 30, 1967, which application is a continuation-in-part of application Ser. No. 370,847, filed May 28, 1964, which applications are now abandoned.

BACKGROUND OF THE INVENTION

This invention relates to lubricating compositions which are useful in glass molding and metal working operations. More particularly, this invention relates to oil-in-water emulsions formed from high molecular weight petroleum oils, which emulsions are useful for lubricating the metal molds used for molding glass. These lubricants prevent the molten glass from sticking to the metal mold.

In molding glass bottles, molten glass, at temperatures of about 1800° to 2200° F., is dropped into a split iron mold which is usually maintained at a temperature of about 700° to 1000° F., e.g., 870° F. The iron mold is then inverted, and compressed air is blown into the mold to spread the molten glass along the confines of the mold, thus shaping the glass. During this shaping period, the glass cools and begins to harden. The two halves of the mold are then separated, and the hot glass article is removed. Next, the two halves of the mold are again brought together, the interior of the mold is sprayed with a lubricant, and the process is repeated.

Molding operations of the type just described are frequently carried out in automatic molding machines, the more common of which utilize two molds. Each of these molds will operate on about a two second cycle so that the machine will produce one shaped glass article every second. The lubricant is usually sprayed into the mold through a spray head spraying over a 360° circle, which spray head is inserted into the depth of the assembled mold and then withdrawn while spraying. At the present time, hand swabbing of portions of the mold is often necessary to supplement the automatic application of the lubricant described above. Thus, when the mold machine operator detects that glass is sticking to a part of the mold, he will manually swab that portion of the mold with additional lubricant. A typical commercial operation will involve hand swabbing of each mold at about every quarter or half hour.

Thus, there is a need for better lubricants than those now existing, which better lubricants would prevent the molten glass from sticking to the molds, thereby eliminating or reducing the number of slowdowns and hand swabbings. Desirably, such improved lubricants would also reduce the number of rejects, minimize fire hazards, etc.

At the present time, a wide variety of lubricants for glass molding are in use. Such lubricants range from simple, inexpensive mineral oils to the very expensive silicone preparations. These lubricants frequently contain such diverse materials as graphite, molybdenum disulfide, boron nitride, high melting waxes, etc.

In general, any lubricant to be used in glass molds should have a boiling point high enough that intolerable amounts of the lubricant will not evaporate from the mold before the glass is added; it should not be decomposed to leave thick deposits on the mold surface; and it should have the necessary lubricating ability, including the ability to wet the mold and wet the glass. Ideally, such lubricants should be relatively inexpensive, and be easily transported from one location to another, e.g., from the manufacturer to the consumer. While many materials have the necessary boiling point and thermal stability, few have the additional ability to adequately lubricate a glass mold. For example, polyphenyl ethers are well known for their high boiling points and thermal stability, but they completely fail to effectively lubricate glass molds.

Excellent lubricants, having the desired characteristics for glass molding, can be made from very high molecular weight (e.g., 690 molecular weight) petroleum oils. Such oils, while having outstanding properties when used alone, were too viscous to be commercially significant at the present time (e.g., they were too viscous to be sprayed directly). Hydrocarbon solutions of these high molecular weight oils (e.g., 5–10 wt. percent of the high molecular weight oil in a light mineral oil having a viscosity of 40 SUS at 210° F.) gave satisfactory lubrication, but were excessively smoky. This latter characteristic is of major importance. This smoke, which was also produced by all other known oil-based lubricants, was sufficient to cause complaints by other employees working in the same well ventilated laboratory during test periods consuming 5–10 grams of oil, less than half of which evaporated.

The elimination of smoke required replacing much of the high molecular weight oil with either a volatile solvent or water. Light naptha, etc., could not be tolerated because of fire hazards and chlorinated solvents, etc., could not be tolerated because of toxicity. Thus, the only practical solution was to emulsify the high molecular weight oil in water. Repeated attempts to utilize conventional emulsifiers in a conventional manner were unsuccessful, however. None were found to be sufficiently compatible with the high molecular weight oil to produce a commercially acceptable product.

SUMMARY OF THE INVENTION

It has now been discovered that a stable oil-in-water emulsion may be prepared from high molecular weight petroleum oils. The oil concentrate used to form this stable oil-in-water emulsion may be prepared by fortifying the high molecular weight oil with a newly discovered combination of surfactants. The water-emulsifiable oil concentrate will comprise:

(a) 40–94 wt. percent of a petroleum base comprising a petroleum bright stock having an average molecular weight of about 550–900, and a hydrocarbon solvent wherein said solvent accounts for 0–40 wt. percent of said base, (b) The balance of said oil concentrate being a surfactant combination in a total amount of at least 6 wt. percent, said surfactant combination comprising at least 0.5 wt. percent of each of (1) an alkoxylated material which is the reaction product of 2–20, preferably 4–10, moles of a $C_2$–$C_3$ olefin oxide per mole of a partial ester of $C_8$–$C_{24}$ aliphatic acid and sorbitol, a $C_{10}$–$C_{20}$ aliphatic alcohol, a $C_{10}$–$C_{20}$ aliphatic acid, a $C_{10}$–$C_{20}$ aliphatic amide, a $C_{10}$–$C_{20}$ aliphatic amine or a mono or dialkyl phenol having 8 to 12 carbon atoms in the alkyl groups of a mixture thereof, (2) a neutralized phosphosulfurized polyolefin, an alkenyl succinic acid or anhydride, or a neutralized alkenyl succinic acid or anhydride wherein said polyolefin and said alkenyl groups are derived from a $C_2$–$C_5$ olefin which is polymerized to a molecular weight of 400–3000, and (3) a $C_4$–$C_{12}$ aliphatic alcohol, cyclohexanol, a $C_1$–$C_4$ alkyl cyclohexanol or a mono or dialkyl phenol having 4 to 12 carbons in the alkyl group as coupling agent.

It has been found that the mere use of one of the three ingredients of the surfactant combination is not sufficient. All three ingredients must be present in significant amounts, i.e., above 0.5 wt. percent and preferably above 1.0 wt. percent each. Even more preferably, at least 2.0 wt. percent of each will be present, for example, 2.0–10.0 wt. percent of each.

Oil concentrates of the present invention will generally consist of from 40–94 wt. percent, more usually 60–90 wt. percent, preferably 70–85 wt. percent of the high molecular weight oil. Preferably, a solvent may be added to facilitate the handling and the emulsification of the concentrate. The solvent may account for 0–40 wt. percent, e.g., 15–40 wt. percent of the mixture of solvent and oil. The amount of surfactant combination which must be in the oil concentrate is at least about 6 wt. percent preferably 10 to 30 wt. percent.

This oil concentrate can be sold, shipped to a consumer and diluted by him with from 0.5 to 100 volumes of water, generally 1–20 volumes, e.g., 5 to 15 volumes of water per volume of oil concentrate. Simple mixing of water with the oil concentrate is usually sufficient to form a stable emulsion suitable for use as a glass mold lubricant. Field tests have shown that the preferred oil concentrate will give optimum results as dilutions of from 5–13:1.

The high molecular weight petroleum oils most suited for use according to the present invention are those oils having an average molecular weight of about 550 to 900, more usually from 575 to 800, and preferably from 600 to 700. Illustrative of these high molecular weight petroleum oils are cylinder stock and bright stock derived from paraffinic or naphthenic crudes. Cylinder stock is defined as the residuum in the still after the lighter parts of the crude oils have been vaporized. Bright stock is obtained by refining of the cylinder stock by suitable treatment such as a combination of acid treatment or solvent extraction and hydrofining with deasphalting, dewaxing or clay finishing.

The preferred high molecular weight petroleum oils suitable for use in the practice of this invention are bright stocks obtained from the propane dewaxing and deasphalting of cylinder stock. These bright stocks will ordinarily have a viscosity at 210° F. of from about 120 to 300 SUS. A typical preferred bright stock will have a boiling point above the molding temperature, e.g., a boiling range at atmospheric pressure of from about 900° F. (5 volumes percent distilled over) to 1100° F. at 50–75 volume percent distilled over. These representative boiling points are measured according to ASTM Method D–1160 at 1 torr and then converted to boiling points at atmospheric pressure. Two preferred bright stocks were found to have the following properties:

TABLE I.—PROPERTIES OF TWO PREFERRED BRIGHT STOCKS

| | Bright Stock | |
| --- | --- | --- |
| | A | B |
| Average molecular weight | 693 | 616 |
| Viscosity at 210° F., SUS | 208 | 154 |
| Flash point, open cup, ° F | 580 | 565 |
| ASTM pour point, ° F | +15 | +15 |
| Viscosity Index | 79.5 | 101.5 |
| Carbon residue | 0.82 | 0.70 |
| ASTM Distillation, ° F. (converted from 1 torr): | | |
| 1 BP | 750 | 877 |
| 5% | 923 | 943 |
| 50% | 1,060 | 1,070 |
| | (1) | (2) |

[1] 74% at 1,117.
[2] 65% at 1,110.
NOTE.—Both oils shown in Table I cracked on further heating.

Solvents which can be used in accordance with the present invention include, but are not limited to, hydrocarbon solvents such as virgin naphthas from paraffinic crudes, refined naphthas of paraffinic or naphthenic nature, normal and branched chain paraffins (e.g., the $C_8$–$C_{20}$ isoparaffins and mixtures thereof), aromatics, alkylated aromatics, etc. Preferably, the flash point of the solvent chosen is above 100° F. Preferably, the solvent will have a low viscosity such that 40 wt. percent or less solvent is adequate to give a viscosity of less than 400 SUS at 100° F. for the mixture of solvent and oil. Preferred solvents are solvent naphthas (e.g., an $SO_2$ extracted virgin naphtha), solvent alkylates (e.g., an isobutane alkylate) and aromatic solvents (e.g., a mixed aromatic solvent with an atmospheric boiling range of about 320° to 360° F.).

The partial esters of sorbitol or sorbitan include the $C_8$–$C_{24}$, e.g., $C_{10}$–$C_{20}$, aliphatic esters thereof. The mono-, di-, and tri-esters are especially useful, with the mono- and tri-esters being the more readily available in commercial quantities. Esters of stearic, oleic, lauric and palmitic acids are especially desirable. The ethylene oxide derivatives are preferred, especially those containing from 2–20, more preferably 4–10, moles of oxide per mole of ester. These preferred epoxide derivatives are known commercially as polyoxyethylene sorbitan fatty acid esters. Typical materials are the reaction products of sorbitan mono- and tri-stearate with from 4–12 moles of ethylene oxide, and the reaction product of sorbitan mono-laurate with 4–12 moles of ethylene oxide. These latter materials are especially preferred. If desired, mixtures of these materials may be used.

The aliphatic acids reacted with the $C_2$–$C_3$ olefin oxide include the aliphatic acids containing from about 10 to about 20 carbon atoms. Fatty acids are preferred, such acids include lauric, palmitic, stearic and oleic acids and the like. The polyoxyethylene dioleate formed by reacting 8 moles of ethylene oxide with 1 mole of oleic acid and subsequently esterifying the free hydroxy group of the product with one additional mole of oleic acid is preferred.

The aliphatic alcohol derivatives of this invention include those products obtained from alcohols containing from about 10 to about 20 carbon atoms. Fatty alcohols are preferred; specific examples of these alcohols include among others, n-dodecyl, n-tetradecyl, n-cetyl, n-octadecyl, oleyl alcohols and the like. The ethoxylated derivatives of the normal $C_{16}$–$C_{18}$ primary alcohols are especially preferred. Alcohols derived from the Oxo process, such as $C_{13}$ Oxo alcohol, are also suitable.

The aliphatic amine deratives of this invention include the products prepared from aliphatic amines having from about 10 to about 20 carbon atoms. Examples of these materials include fatty amines, such as laurylamine, cetylamine, octadecylamine, eicosylamine, oleylamine and the like. The ethoxylated deratives of the normal $C_{16}$–$C_{18}$ primary amines are preferred.

The aliphatic amide derivatives suitable for use in this invention include the amides derived from the aliphatic acids mentioned above.

The alkyl phenols which are reacted with ethylene oxide or propylene oxide include the mono- or di-alkyl phenols having from about 8 to about 12 carbon atoms in the alkyl group. Specific examples include, among others, p-octyl phenol, nonyl phenol, di-nonyl phenol, p-dodecyl phenol, di-dodecyl phenol and the like. Ethoxylated p-nonyl phenols have been found to be especially effective.

The present invention is not known to be dependent in any way on the method of preparing the aforedescribed alkoxylated derivatives. Methods for their preparation are well known to those skilled in the art. Consequently, such materials may be used regardless of their source.

The second essential ingredient in the surfactant combination is a high molecular weight polymeric acid, which is preferably neutralized. Such materials as are herein contemplated are those of the type used as detergents in motor oils. They are based on polymers of $C_2$–$C_5$ olefins wherein the polymer has a molecular weight (Staudinger) of from 400–3000, more usually from 700–1400. The acid forms of these polymers are obtained by reaction of the polymers with $P_2S_5$ or with maleic anhydride, etc., as is known in the lubricating art. $P_2S_5$ treated polybutene and polybutenyl succinic anhydride or acid are preferred. A suitable material is polyisobutenyl succinic anhydride or the corresponding acid which may be used as such or reacted with an amine or alcohol; the isobutenyl group preferably has a molecular weight in the range of 4000–3000. These materials are well known in the lubricating art. See, for example, U.S. Patents Nos. 3,018,247; 3,018,250; and 3,018,291, as well as British Patent No. 922,831 (all incorporated herein by reference). Since the methods of forming the polymers, the acid derivatives thereof, and subsequent neutralization of the acid derivatives are all well known in the art and, further, since the choice of such methods is immaterial to the present invention, any of the numerous processes available can be used therefor. Neutralization of the aforedescribed acid derivatives may be accomplished with conventional bases (e.g., sodium hydroxide, potassium hydroxide, etc.) or with amines (e.g., triethanolamine) and such neutralization may be done prior to adding the acid derivatives to the high molecular weight oil or it may be done in situ in the oil. Many amine derivatives of monoalkenyl succinic anhydride are commercially available and are well suited for use according to this invention. Suitable amine neutralizing agents are adequately described in the prior art. Preferred amine neutralizing agents are the alkyl and alkanol amines (e.g., triethanolamine and the ethylene diamines (e.g., tetraethylene pentamine). The ethylene diamines containing 1–5 ethylene residues are especially useful. Mixtures of amines may be used. Ammonia may also be used. Other neutralizing agents for the succinic derivatives include the acyclic, cycloaliphatic, or aromatic alcohols such as methanol, butanol, 3-ethyl-2-pentanol, dodecanol, cyclohexanol, trimethylcyclohexanol, benzyl alcohol, diphenylcarbinol, phenylpropyl alcohol, ethanolamine, 4-chloro-1-heptanol and the like, which will form esters. A preferred alcohol is ethylene diamine tetraethanol.

The third essential ingredient in the surfactant combination is a coupling agent. Coupling agents serve to create disorder in the surfactant monolayer, thereby causing the surfactants to become more effective. It appears that a coupling agent creates gaps in the surfactant monolayer, which gaps are then filled with water and/or oil. Cyclohexanol is extremely effective as a coupling agent, while isopropanol, mono-, di- and tri-ethylene glycol, glycerol and butane-1,3-diol, when used alone, are unsatisfactory. Substitutes for cyclohexanol are $C_4$–$C_{12}$ aliphatic alcohols, preferably $C_4$–$C_8$ tertiary alcohols, e.g., t-butanol and t-amyl alcohol, lower alkyl (e.g., $C_1$–$C_4$ alkyl) cyclohexanols and mono or dialkyl phenols having 4 to 12 carbon atoms in the alkyl group, e.g., p-octyl phenol, di-nonyl phenol and p-dodecyl phenol. Mixtures of these coupling agents may be used.

It is desirable (but not necessary) to supplement the three essential surfactants with certain additional surfactants so as to improve or stabilize the hydrophilic/lipophilic balance (HLB). The optimum HLB is about 6–14, e.g., about 10–12. The HLB is defined in the art as twenty times the ratio of the water-wetted (hydrophilic) weight in the surfactant molecule to the total molecular weight. See Griffin, W. C., Jour. Soc. Cosmet. Chemists, vol. 1, page 311 (1949). Thus, a surfactant containing 30% hydrophilic groups (e.g., polyoxyethylene) would have an HLB of 6.

The classes of additional surfacetants that may be used are:

Class 1

This class includes the high HLB materials such as triethanolamine (which is essentially 20 HLB). High HLB amines, e.g., triethanolamine, can serve to both neutralize the acid derivatives of the olefin polymers and also to act as supplemental surfactants. As previously indicated, the neutralization of the acid polymers can be accomplished with conventional bases, e.g., sodium or potassium hydroxide, but the results are less satisfactory since those bases are ordinarily used in the form of their water solutions and also produce water as a by-product of the neutralization. When neutralization is done in situ, this water tends to separate and/or causes the resulting oil concentrate to be cloudy. The amines are free from these problems and can be used effectively in situ. Presumably, the neutralization could be done with any non-volatile alkyl or alkylol amine (but not aryl amines).

The average HLB can also be raised by adding additional (the same or different) high HLB surfactant. Thus, it is possible to:

(a) Use an amine (preferably one having a boiling point at atmospheric pressure of over 300° F.) in an amount sufficient to both neutralize free polymer acid and help raise the HLB. Suitable amines include ethanolamine, diethanolamine, triethanolamine; the corresponding propanol and butanol amines; mixed ethanol and propanol amines; etc., or (b) Use a base (e.g., alkali metal or alkaline earth metal base) as a neutralizing agent and then adding a high HLB surfactant (e.g., non-volatile amine) to raise the average HLB.

Class 2

This class includes the surfactants having a medium HLB (e.g., HLB of 6–14) and medium molecular weight. These surfactants (usually petroleum sulfonates) are used to increase the total surfactant content of the oil concentrate without losing the desired HLB. The need for surfactants of this class is not critical, but their use is preferred so as to stabilize the HLB balance. Suitable medium HLB and medium molecular weight sulfonates include the petroleum sulfonates having an average molecular weight of, for example, 400 to 11000. These sulfonates are used in amounts of at least 1.0 wt. percent based on the total composition. One desirable sulfonate of this type is a sodium or calcium petroleum sulfonate having an average molecular weight of 500.

Various other additives may optionally be added to the oil concentrates of this invention in varying amounts. Examples of such additives include molybdenum disulfide, boron nitride, and silicon-containing materials; oxidation inhibitors such as 2,6-ditertiary butyl 4-methyl phenol; additives for prevention of bacteria or fungus growth such as trihydromethyl-nitromethane; etc.

DESCRIPTION OF THE PREFERRED EMBODIMENTS

The present invention will be more clearly understood by reference to the following examples which include a preferred embodiment. Unless otherwise indicated, all parts are parts by weight and all percentages are weight percentages.

Example 1

A preferred oil concentrate of a lubricant is prepared by simple mixing of the ingredients. 79.6 parts of a solvent/oil mixture consisting of:

| | Percent |
|---|---|
| 600–700 molecular weight bright stock | 78.1 |
| Aromatic solvent (Solvesso 100) | 22.9 |
| | 100.0 | is mixed with 20.4 parts of a surfactant combination consisting of 6.5 parts of Tween 65 (a condensation product of 20 moles of ethylene oxide with sorbitan tri-stearate), 9.2 parts of Paranox 351 (a superbased mixture of $P_2S_5$ treated polybutene of 780 molecular weight and alkyl phenol; superbasing accomplished with barium oxide and carbon dioxide), 3.2 parts of cyclohexanol, and 1.5 parts of Acto 639 (a 500 molecular weight sodium sulfonate).

Example 2

The oil concentrate of Example 1 is diluted with ten volumes of water per volume of concentrate and agitated. A stable oil-in-water emulsion is formed. This emulsion shows little creaming after remaining in a quiescent state for twenty-four hours. Plant scale tests confirm the utility of this emulsion when used in a #62 Hartford I.S. machine making ½ gallon screw-top flint orange juice bottles.

Example 3

The oil concentrate of Example 1 is diluted with seven volumes of water per one volume of concentrate and agitated. A stable oil-in-water emulsion is formed which shows little creaming after remaining twenty-four hours in a quiescent state. Plant scale tests confirm the utility of this product for glass molding operations. These tests clearly show the substantial elimination of smoke which had previously been a problem with prior oil-type products.

Example 4

Ninety-five parts of the solvent/oil mixture of Example 1 is mixed wth five parts of the surfactant combination of Example 1. Attempts to emulsify this oil concentrate in water by simple mixing are unsuccessful.

Example 5

Ninety parts of the solvent/oil mixture of Example 1 is mixed with ten parts of the surfactant combination of Example 1. This oil concentrate is emulsifiable in water by simple mixing.

Examples 6 and 7

Oil concentrates are prepared as described in Example 1 except that in Example 6 t-butyl alcohol is substituted for cyclohexanol and t-amyl alcohol is used in Example 7 in place of cyclohexanol. Both oil concentrates (Examples 6 and 7) are emulsifiable in water.

Example 8

An oil concentrate is prepared as described in Example 1 except that the Acto 639 (500 molecular weight sodium sulfonate) is eliminated. This oil concentrate is still emulsifiable in water.

Example 9

An oil concentrate is prepared by simple mixing of eighty parts of the solvent/oil mixture of Example 1 and twenty parts of a surfactant combination consisting of sensible amounts of cyclohexanol, the reaction product of sorbitan mono-laurate and 16–20 moles of ethylene oxide, and phosphosulfurized polybutene of 780 molecular weight previously neutralized with sodium hydroxide. This oil concentrate is emulsifiable in water.

Example 10

An oil concentrate is prepared as described in Example 9 except that the phosphosulfurized polybutene is neutralized with triethanolamine instead of sodium hydroxide. The oil concentrate is again emulsifiable in water.

Example 11

The following compositions presented in Table II were prepared according to the method described in Example 1 and compared with compositions which do not comply with requirements of the invention. In this example and those which follow, the term "cream" or "light cream" is the least objectional type of separation; "heavy cream" and "oily cream" indicate intermediate types of separation while the term "free oil" or "oily layer" indicate intermediate types of separation while the term "free oil" or "oily layer" represents the worst type of separation.

TABLE II

| | Composition of Example 1 | Composition A | Composition B |
|---|---|---|---|
| Formulation of Concentrate: | | | |
| Base Oil [1] | 79.6 | 79.6 | 79.6. |
| Tween 65 [2] | 6.5 | 15.7 | |
| Neutralized Polymeric Acid [3] | 9.2 | | 15.7. |
| Cyclohexanol | 3.2 | 3.6 | 3.2. |
| Sodium Sulfonate [4] | 1.5 | 1.5 | 1.5. |
| Appearance of Concentrate | Homogeneous | Separated after 2 hours to a 20% phase and an 80% phase. | Homogeneous. |

Stability of 9 cc. Concentrate/90 cc. $H_2O$

| Time: | | |
|---|---|---|
| 10 Min., cc. separation | 0.5 Cream | |
| 1 Hr., cc. separation | 1.5 Cream | Separated in 5 minutes to form about 9 cc. oily layer and about 90 cc. cloudy watery layer. |
| 2 Hr., cc. separation | do | |
| 19 Hr., cc. separation | 2.0 Cream | |
| 24 Hr., cc. separation | do | |
| 36 Hr., cc. separation | 5.0 Cream | |

[1] Base Oil =78.1% by weight of 600–700 mol. wt. bright stock; 21.9% by weight of aromatic solvent (Solvesso 100).
[2] Trademark of the Atlas Powder Co. for a condensation product of 20 moles of ethylene oxide with sorbitan tri-stearate.
[3] Mixture of $P_3S_5$-treated polybutene of 780 molecular weight and an alkyl phenol overbased with BaO and $CO_2$.
[4] Sodium petroleum sulfonate of 450–550 molecular weight.

Thus, as seen by the preceding table, all three of the essential ingredients of this invention must be present in order to obtain a stable emulsion. In other words, Composition A, which was the same as the composition of Example 1, except that no neutralized polymeric acid (i.e., a member of the aforedescribed second essential ingredient) was used but instead a proportionately larger amount of Tween 65 (i.e., a member of the aforedescribed first essential ingredient) was used, resulted in a concentrate which was substantially unstable. Similarly, Composition B which was the same as the composition of Example 1, except that no Tween 65 was used, but instead a proportionately larger amount of neutralized polymeric acid was used, resulted in a homobeneous appearing concentrate which, however, upon being diluted with distilled water to form an emulsion, separated to form an oily layer and a watery layer. Thus, in order to form a material for glass molding, emulsifiers of both the types represented by Tween 65 and neutralized polymeric acid are required inasmuch as the use of either type alone will either not form a satisfactory concentrate or a satisfactory emulsion.

Example 12

This serves to further illustrate the necesity of employing a member from each class of the aforedescribed essential ingredients.

In this example, 9 cc. of the following oil concentrates were mixed with 90 cc. of distilled water (with and without the presence of $CaCl_2$) to form an emulsion in a 100 cc. graduated cylinder. As in Example 2, the appearance of the emulsions was observed at various time intervals. The results were as follows:

TABLE III

|  | Composition of this Invention | Composition C | Composition D |
|---|---|---|---|
| Formulation of Concentrate: |  |  |  |
| Base Oil [1] | 75.0 | 75.0 | 75.0 |
| PIBSA/TEPA [2] | 6.0 |  | 19. |
| Ethoxylated Oleic Acid [3] | 6.5 | 9.5 |  |
| Ethoxylated Octyl Phenols [4] | 3.5 | 5.1 |  |
| Ethoxylated Oleyl Amine [5] | 3.0 | 4.4 |  |
| Cyclohexanol | 2.0 | 2.0 | 2.0 |
| Sodium Sulfonate [6] | 4.0 | 4.0 | 4.0 |

Stability of 9 cc. Concentrate/90 cc. $H_2O$

| Time: |  |  |  |
|---|---|---|---|
| 1 Hr., cc. separation | Trace | 9.0, Light Cream | Separated within one hour to form about 90 cc. watery layer, 8 cc. oily layer and 2.0 cc. Cream. |
| 2 Hr., cc. separation | 1.5, Oily Cream | do |  |
| 4 Hr., cc. separation | 2.0, Oily Cream | 21, Light Cream |  |
| 14 Hr., cc. separation | do | 16.5, Oily Cream |  |

Stability of 9 cc. Concentrate/90 cc. $H_2O$—300 p.p.m. $CaCl_2$

| Time: |  |  |  |
|---|---|---|---|
| 1 Hr., cc. separation | 0.5, Oily Cream | 2.0, Heavy Cream | Separated within one hour to form about 90 cc. watery layer 8 cc. oily layer and 2.0 cc. Cream. |
| 2 Hr., cc. separation | 1.0, Oily Cream | 3.5, Heavy Cream |  |
| 4 Hr., cc. separation | do | 4.0, Heavy Cream |  |
| 14 Hr., cc. separation | do | 5.0, Heavy Cream |  |

[1] Base Oil=2 parts by weight of 600-700 mol. wt. bright stock and 1 part by weight of heavy aromatic naphtha $SO_2$ extract containing 89.4 aromatics and 10.6 paraffinics and having a viscosity of 1.67 cs. at 100° F., an ASTM mixed aniline point of 75.0, an ASTM gravity of ° API 20.4, and boiling within the range 351°-526° F.
[2] Reaction product of 1 mole of tetraethylene pentamine with 1 mole of polyisobutylene succinic anhydride of about 1,200 molecular weight.
[3] Reaction product of 8 moles ethylene oxide per mole oleic acid.
[4] Reaction product of 7.5 moles of ethylene oxide per mole of p-octyl phenol.
[5] Reaction product of 5 moles of ethylene oxide per mole of oleyl amine.
[6] Sodium petroleum sulfonate of 450-550 molecular weight.

As seen by the data of Table III, in order to prepare suitable emulsions, it is necessary to employ both the types of materials represented by PIBSA/TEPA (the second essential ingredient) and those represented by the ethoxylated materials (the first essential ingredient).

Example 13

The following concentrate compositions within the scope of the present invention were emulsified with hard water and tested for stability in the manner of Examples 11 and 12. The results are given below in Table IV.

TABLE IV

|  | Composition A | Composition E | Composition F |
|---|---|---|---|
| Formulation of Concentrate: |  |  |  |
| Base Oil [1] | 75.0 | 78.0 | 75.0 |
| PIBSA/TEPA [2] | 6.0 |  |  |
| PIBSA/EDTE [3] |  |  | 6.0 |
| PIBSA [4] |  | 3.0 |  |
| Ethoxylated Oleic Acid [5] | 6.5 | 6.5 | 6.5 |
| Ethoxylated Octyl Phenol [6] | 3.5 | 3.5 | 3.5 |
| Ethoxylated Oleyl Amine [7] | 3.0 | 3.0 | 3.0 |
| Sodium Sulfonate [8] | 4.0 | 4.0 | 4.0 |
| Cyclohexanol | 2.0 | 2.0 | 2.0 |

Hard Water Stability of 9 cc. Concentrate/90 cc. $H_2O$—300 p.p.m. $CaCl_2$

| Time: |  |  |  |
|---|---|---|---|
| 1 Hr., cc. separation | 0.5, Oily Cream | 5.0, Cream; 95 White Emulsion | <1.0, Oily Cream. |
| 2 Hr., cc. separation | 1.0, Oily Cream | do | Do. |
| 4 Hr., cc. separation | do | do | Do. |
| 14 Hr., cc. separation | do | do | 1.0, Cream. |
| 19 Hr., cc. separation | do | do | Do. |
| 24 Hr., cc. separation |  | do |  |

[1] See footnote (1) of Table III.
[2] See footnote (2) of Table III.
[3] Reaction product of 4 moles of polyisobutenyl succinic anhydride (1,200 molecular weight) with 1 mole ethylene diamine tetraethanol; 50% active ingredient.
[4] Polyisobutenyl succinic anhydride (1,200 molecular weight).
[5] See footnote (3) of Table III.
[6] See footnote (4) of Table III.
[7] See footnote (5) of Table III.
[8] See footnote (6) of Table III.

It will be seen from the data of Table IV that satisfactory emulsions can be prepared by using as the second essential surfactant ingredient an alkenyl succinic anhydride or an alcohol or amine derivative thereof.

Example 14

A blend consisting of 50 parts of bright stock having a molecular weight of 600 to 700, 6 parts of PIBSA/TEPA, 6.5 parts of ethoxylated oleic acid, 3.5 parts of ethoxylated octyl phenol, 3.0 parts of ethoxylated oleyl amine, 4.0 parts of sodium sulfonate and 2.0 parts of cyclohexanol was prepared; these materials were of the same chemical composition as the materials used in the preparation of Composition A in Table IV. The present blend contained however no solvent. In preparing the emulsion, 7.5 cc. of this concentrate was emulsified by vigorous mechanical stirring with 92.5 cc. of hard water (300 p.p.m. $CaCl_2$) and the separations in cc. determined at the following time periods:

1 hr. cc.—No separation
2 hr. cc.—Trace oily cream
4 hr. cc.—Trace oily cream
18 hr. cc.—0.5 cc. free oil It will be seen from the above data that satisfactory emulsions of bright stock can be prepared in accordance with the invention without the use of the aforedescribed hydrocarbon solvents.

Although the present invention is primarily directed to lubricants useful in molding glass, the compositions of this invention can be used for other purposes. For example, these lubricants can also be used in various die-casting operations to lubricate metal molds used for casting aluminum, zinc, etc. where they operate as mold release agents to prevent sticking. These lubricants may also be used for various other purposes, particularly those involving high temperature operations.

Having described the invention with a certain degree of particularlity, it will be realized that numerous minor changes may be made by the routineer without departing from the true nature and scope of this invention as revealed by this disclosure and the appendant claims. The headings used throughout this disclosure are not meant to be limiting, but are provided only as a convenience to the reader.

What is claimed is:
1. An oil concentrate comprising:
  (a) 40–94 wt. percent of a base oil consisting essentially of petroleum oil selected from the group consisting of residual cylinder stock, residual bright stock and mixtures thereof, said oil having an average molecular weight of about 550–900, and a hydrocarbon solvent wherein said solvent accounts for 5 to 40 wt. percent of said base,
  (b) the balance of said oil concentrate being a surfactant combination in a total amount of at least 6 wt. percent, said surfactant combination comprising at least 0.5 wt. percent of each of (1) an alkoxylated material which is the reaction product of 2–20 moles of a $C_2$–$C_3$ olefin oxide per mole of a partial ester of $C_8$–$C_{24}$ hydrocarbyl aliphatic mono-carboxylic acid and sorbitol, a $C_{10}$–$C_{20}$ hydrocarbyl aliphatic mono-carboxylic alcohol, a $C_{10}$–$C_{20}$ hydrocarbyl aliphatic mono-carboxylic acid, a $C_{10}$–$C_{20}$ hydrocarbyl aliphatic mono-amide, a $C_{10}$–$C_{20}$ hydrocarbyl aliphatic mono-amine or a mono or dialkyl phenol having 8 to 12 carbon atoms in the alkyl groups or a mixture thereof, (2) a neutralized phosphosulfurized polyolefin or a neutralized alkenyl succinic acid or anhydride wherein said polyolefin and said alkenyl groups are derived from a $C_2$–$C_5$ olefin which is polymerized to a molecular weight of 400–3000, and (3) a $C_4$–$C_{12}$ hydrocarbyl aliphatic mono-hydric alcohol, cyclohexanol, a $C_1$–$C_4$ alkyl cyclohexanol or a mono or dialkyl phenol having 4 to 12 carbons in the alkyl group.

2. An oil concentrate as defined in claim 1 wherein said surfactant component (1) is an alkoxylated material which is the reaction product of 2–20 moles of a $C_2$–$C_3$ olefin oxide per mole of a partial ester of $C_8$–$C_{24}$ fatty acid and sorbitol, a $C_{10}$–$C_{20}$ fatty alcohol, a $C_{10}$–$C_{20}$ fatty acid, a $C_{10}$–$C_{20}$ aliphatic amine, a $C_8$–$C_{12}$ alkyl phenol or mixtures thereof.

3. An oil concentrate as defined in claim 2 wherein said base has a viscosity of less than 400 SUS at 100° F. and said surfactant component (3) is cyclohexanol.

4. An oil concentrate as defined in claim 3 wherein said bright stock has a molecular weight of from about 600–700 and said surfactant components (1), (2) and (3) are present in an amount of at least 2 wt. percent.

5. An oil concentrate as defined in claim 4 wherein said surfactant component (1) is an alkoxylated material which is the reaction product of ethylene oxide with a partial ester of $C_{12}$–$C_{18}$ fatty acid and sorbitol, a $C_{16}$–$C_{18}$ fatty alcohol, a $C_{12}$–$C_{18}$ fatty acid, a $C_{16}$–$C_{18}$ primary amine, a $C_8$–$C_{12}$ alkyl phenol or mixtures thereof.

6. An oil concentrate as defined in claim 1 wherein said surfactant combination comprises: (1) neutralized phosphosulfurized polybutene, (2) ethoxylated sorbitan tri-stearate, and (3) cyclohexanol.

7. A lubricant suitable for use in glass molding and metal working operations which comprises an oil-in-water emulsion consisting essentially of the oil concentrate of claim 2 and water in a volume ration of from 1–20 parts of water per one part concentrate.

8. A lubricant suitable for use in glass molding and metal working operations which comprises an oil-in-water emulsion consisting essentially of the oil concentrate of claim 4 and water in a volume ratio of from 1–20 parts of water per one part concentrate.

9. A lubricant suitable for use in glass molding and metal working operations which comprises an oil-in-water emulsion consisting essentially of an oil concentrate and water in a volume ratio of from 1–20 parts of water per one part concentrate, said concentrate including:
  (a) 40–94 wt. percent of a base oil consisting essentially of (1) a petroleum oil selected from the group consisting of residual cylinder stock, residual bright stock and mixtures thereof, said oil having an average molecular weight of about 550–900, and (2) a hydrocarbon solvent wherein said solvent accounts for 0–40 wt. percent of said base,
  (b) a surfactant combination in a total amount of at least 6 wt. percent, said surfactant combination comprising at least 0.5 wt. percent of each of (1) an alkoxylated material which is the reaction product of 2–20 moles of a $C_2$–$C_3$ olefin oxide per mole of a partial ester of $C_8$–$C_{24}$ hydrocarbyl aliphatic monocarboxylic acid and sorbitol, a $C_{10}$–$C_{20}$ hydrocarbyl aliphatic mono-hydric alcohol, a $C_{10}$–$C_{20}$ hydrocarbyl aliphatic mono-carboxylic acid, a $C_{10}$–$C_{20}$ hydrocarbyl aliphatic mono-amide, a $C_{10}$–$C_{20}$ hydrocarbyl aliphatic mono-amine or a mono or dialkyl phenol having 8 to 12 carbon atoms in the alkyl groups or a mixture thereof, (2) a neutralized phosphosulfurized polyolefin, an alkenyl succinic acid or anhydride, or a neutralized alkenyl succinic acid or anhydride wherein said polyolefin and said alkenyl groups are derived from a $C_2$–$C_5$ olefin which is polymerized to a molecular weight of 400–3000, and (3) a $C_4$–$C_{12}$ hydrocarbyl aliphatic mono-hydric alcohol, cyclohexanol, a $C_1$–$C_4$ alkyl cyclohexanol or a mono or dialkyl phenol having 4 to 12 carbons in the alkyl group.

10. In a method of glass molding wherein molten glass, or a hot glass parison is placed in contact with a lubricant-coated hot metal mold surface and is shaped against said surface followed by removal from said contact, the improvement wherein said lubricant comprises the oil-in-water emulsion defined by claim 9.

References Cited

UNITED STATES PATENTS

| | | | |
|---|---|---|---|
| 2,717,265 | 9/1955 | Johnson | 252—33 X |
| 2,767,209 | 10/1956 | Asseff et al. | 252—32.7 X |
| 2,768,999 | 10/1956 | Hill | 252—32.7 X |
| 2,770,595 | 11/1956 | Jezl | 252—49.5 X |
| 2,841,554 | 7/1958 | Ambrose et al. | 252—49.5 X |
| 3,028,335 | 4/1962 | Shamaiengar | 252—49.5 X |
| 3,039,969 | 6/1962 | Colucci et al. | 252—49.5 X |
| 3,052,629 | 9/1962 | Morrow et al. | 252—49.5 X |
| 3,219,666 | 11/1965 | Norman et al. | 252—51.5 X |
| 3,378,494 | 4/1968 | Berger | 252—49.5 X |

OTHER REFERENCES

Kirk et al.: "Encyclopedia of Chem. Techology," vol. 5 (1959), page 709.

Clayton: "Theory of Emulsions," 5th edition (1954), pp. 181–182 and 482–485.

Becher: "Emulsions—Theory and Practice," 2nd edition (1965), pub. by Reinhold Pub. Corp., pp. 234 and 238–252.

DANIEL E. WYMAN, Primary Examiner

W. H. CANNON, Assistant Examiner

U.S. Cl. X.R.

252—49.5, 51.5, 56